United States Patent
Keis et al.

(10) Patent No.: US 9,588,753 B2
(45) Date of Patent: Mar. 7, 2017

(54) INTER-INSTANCE COMMUNICATION IN A CONTAINERED CLUSTERED SERVER ENVIRONMENT

(71) Applicant: MORGAN STANLEY, New York, NY (US)

(72) Inventors: Andrei Keis, Fort Lee, NJ (US); Richard Viana, Summit, NJ (US)

(73) Assignee: MORGAN STANLEY, New York, NY (US)

( * ) Notice: Subject to any disclaimer, the term of this patent is extended or adjusted under 35 U.S.C. 154(b) by 1 day.

(21) Appl. No.: 14/714,734

(22) Filed: May 18, 2015

(65) Prior Publication Data

US 2016/0342401 A1 Nov. 24, 2016

(51) Int. Cl.
G06F 15/173 (2006.01)
G06F 9/445 (2006.01)
H04L 29/08 (2006.01)
H04L 29/06 (2006.01)

(52) U.S. Cl.
CPC .............. *G06F 8/61* (2013.01); *H04L 67/06* (2013.01); *H04L 67/42* (2013.01)

(58) Field of Classification Search
CPC .............. G06F 7/78; G06F 8/00–8/78; G06F 9/44–9/455; G06F 11/36
See application file for complete search history.

(56) References Cited

U.S. PATENT DOCUMENTS

| 2006/0015866 | A1 | 1/2006 | Ang et al. |
| 2006/0031404 | A1* | 2/2006 | Kassab ............. G06F 17/30893 709/218 |
| 2007/0234346 | A1 | 10/2007 | Kramer et al. |
| 2011/0072505 | A1 | 3/2011 | Ott |
| 2011/0145657 | A1 | 6/2011 | Bishop et al. |
| 2011/0173251 | A1 | 7/2011 | Sandhu et al. |
| 2011/0265164 | A1* | 10/2011 | Lucovsky ........... G06F 9/45533 726/7 |
| 2013/0170451 | A1* | 7/2013 | Krause .................... H04L 69/14 370/329 |
| 2013/0297802 | A1 | 11/2013 | Laribi et al. |

OTHER PUBLICATIONS

Nguyen, Overlapping Communities in Dynamic Networks: Their Detection and Mobile Applications, 2011.*

* cited by examiner

*Primary Examiner* — Wei Zhen
*Assistant Examiner* — Zhan Chen
(74) *Attorney, Agent, or Firm* — Weitzman Law Offices, LLC; Kenneth Weitzman

(57) ABSTRACT

A method and a system environment are disclosed that allow for installation of an instance of an ensemble application into a container in excess capacity of an existing server and that allows the instance to coexist with a legacy application on the server and communicate with other instances of the ensemble application on other servers.

12 Claims, 4 Drawing Sheets

INTER-INSTANCE COMMUNICATION IN A CONTAINERED CLUSTERED SERVER ENVIRONMENT

BACKGROUND

1. Field

This disclosure relates generally to computers, and, more particularly, to clustered client-server architecture infrastructure.

2. Background

Most businesses use multiple networked servers, in some cases, many, many servers networked into clusters to handle their IT infrastructure needs. However, it is well known that applications/programs rarely use the full capabilities of existing servers on which they run, particularly for typical server deployments in a clustering environment, e.g., data center servers, leaving many servers with underutilized, excess capacity. Such server capacity may be underutilized for various reasons, for example, to allow for performance spikes or due to the possibility of interference between applications/programs.

Because of the way some programs are written so as to be able to communicate with the "outside world" (i.e., other computers on the network, be it a small network within the company or the internet) while not knowing where they will be installed, if one needs to add an application/program in a clustering environment it is extremely difficult to use that underutilized, excess server capacity along side the existing (i.e., "legacy") applications/programs because, since the applications do not know where they will be installed, port assignment is done dynamically at installation using a technique called "dynamic discovery" that allows the new application to identify its location and advertise its presence on a network.

Dynamic discovery operates such that, when the application is initially installed or run on a server, the application will "announce" to the network "I am here" and provide a zero value for the port value indicating where "here" is. The operating system, which maintains a table of all used and available ports for each server (denoted by a "Host Name"), will then intercept that initial announce and assign a free port in place of the zero value to denote where "here" is, and thereafter, that is the port through which the application/program will be reachable from the other programs. Various programs may be used to implement the service for dynamic discovery including, for example, in the Linux environment, Apache ZooKeeper, Consul, Etcd, Eureka, etc.

However, there is a class of applications, interchangeably referred to herein as "ensemble applications" and "ensemble programs" that involve multiple instances of the same program being deployed and run on multiple servers. One example application within that class is Apache Cassandra, which is an open source distributed database management system designed to handle large amounts of data across many servers involving clusters spanning multiple datacenters. In general, ensemble applications specify or require that all instances use the same port number(s) irrespective of the host servers on which they are running. That is because the applications typically use proprietary network connections among the various instances.

Unfortunately, a current trend is to use "lightweight containers" for applications in clustered server environments. This creates a technological impediment that prevents, or makes very difficult, the use of any existing excess server capacity for applications of this class. That is because each lightweight container must be isolated from any other lightweight containers (hereafter interchangeably referred to as "legacy components" or "legacy containers") on the same server(s), i.e., they cannot use any of the same ports. This in enforced through the dynamic discovery process such that each lightweight container has its ports independently dynamically assigned without regard to any other lightweight container.

As a result, presently, the only way to ensure independence when adding a new lightweight container to an existing server would be to add a new hostname for that lightweight container on that existing Host (if possible). However, adding a new hostname requires significant additional detailed work, additional IP addresses, it requires new security for that Host, and additional complexity that must be supported, etc. Moreover, adding an ensemble application into such a container adds an additional layer of problems due to the need to have all instances use the same ports as noted above.

Dynamic discovery is antithetical to that requirement because (i) it cannot guarantee the same port assignments to all instances, and (ii) the required ports for the instances may already be allocated to other legacy applications.

Thus, there is presently a significant technological problem inhibiting the ability to make use of excess server capacity by adding ensemble applications that run in lightweight containers onto one or more servers that already contain legacy components.

BRIEF SUMMARY

One aspect of this disclosure involves a method for installing an instance of an ensemble application in excess capacity of a legacy server in a cluster that allows for inter-instance communication. The method involves identifying a server having excess capacity suitable for installation of an instance of the ensemble application; receiving a manifest file at the server, the manifest file including at least an expected communication port for the instance of the ensemble application; creating a container for the instance of the ensemble application on the identified server; installing the instance of the ensemble application within the container; assigning the expected communication port to the instance of the ensemble application; dynamically assigning an available actual port to the container containing the instance of the ensemble application; creating IP Tables rules applicable to the instance of the ensemble application that will:

i) modify network connections, received from an other instance of the ensemble application on another server that are directed to the assigned actual port of the container containing the instance of the ensemble application, from the assigned actual port to the expected port within the container for the instance of the ensemble application; and ii) modify network connections, sent by the instance of the ensemble application via the expected port and directed to the expected port of a separate instance of the ensemble application on a different server, to a specific actual port indicative of where the separate instance of the ensemble application is running.

Advantageously, this technique allows an ensemble application running in lightweight containers to communicate with each other despite being part of a dynamic discovery environment and having different port addresses.

Another aspect of this disclosure involves a server environment system comprising multiple servers interconnected to each other in a cluster on a network. The system involves a first server having a first instance of an ensemble application installed in a first container thereon alongside a first legacy application that was installed on the first sever prior to creation of the first container. The first container has a first dynamically assigned port.

The system also involves a second server having a second instance of the ensemble application installed in a second container thereon. The second container has a second dynamically assigned port.

The first and second instances each have an identical expected port via which they expect to receive inter-application communications.

The system also involves a first framework agent, running on the first server, that caused installation of the first instance within the first container. The system likewise involves a second framework agent running on the second server, the second framework agent caused installation of the second instance within the second container.

The system additionally involves a custom shared library on the first server including IP Tables rules. The custom shared library is interposed between the first container and the network and is configured to (i) trap communications, sent by the first instance and intended for the expected port of the second instance, and redirect it to the dynamically assigned port of the second container, and (ii) trap communications sent to the first instance, via the dynamically assigned port of the first container, and redirect them to the expected port of the first instance.

The foregoing has outlined rather generally the features and technical advantages of one or more embodiments of this disclosure in order that the following detailed description may be better understood. Additional features and advantages of this disclosure will be described hereinafter, which may form the subject of the claims of this application.

BRIEF DESCRIPTION OF THE DRAWINGS

This disclosure is further described in the detailed description that follows, with reference to the drawings, in which.

DETAILED DESCRIPTION

We have devised a technological solution to the above problems, that allows for use of excess capacity of an existing Host server for a new network-discoverable (from a client perspective) ensemble application alongside a legacy application having a hostname on that existing Host server inside a new container having its own namespace while the new container in which the ensemble application will be installed shares its hostname with the Host.

Our solution is a technological advance in this important area because it does not require a new Host name, IP address, or changes to the ensemble application/program (i.e., the application/program is "container unaware") and, despite the ensemble application requirement regarding using the same ports among all instances, allows for dynamic discovery to be used as part of the installation process.

In simplified overview, one variant of our approach uses a framework that takes advantage of the shared libraries capability of the Linux and Unix operating systems to capture and re-route traffic to/from the ensemble application such that (from an ensemble instance perspective) it appears as if the listen and output ports for each other ensemble instance is the same, even though the ports for the other instances of the ensemble application will likely be different due to the dynamic discovery process. By employing the teachings herein, similar variants of our approach can be implemented with other operating systems, for example, Apple's OS X operating system or the Windows operating system.

Figure 1:
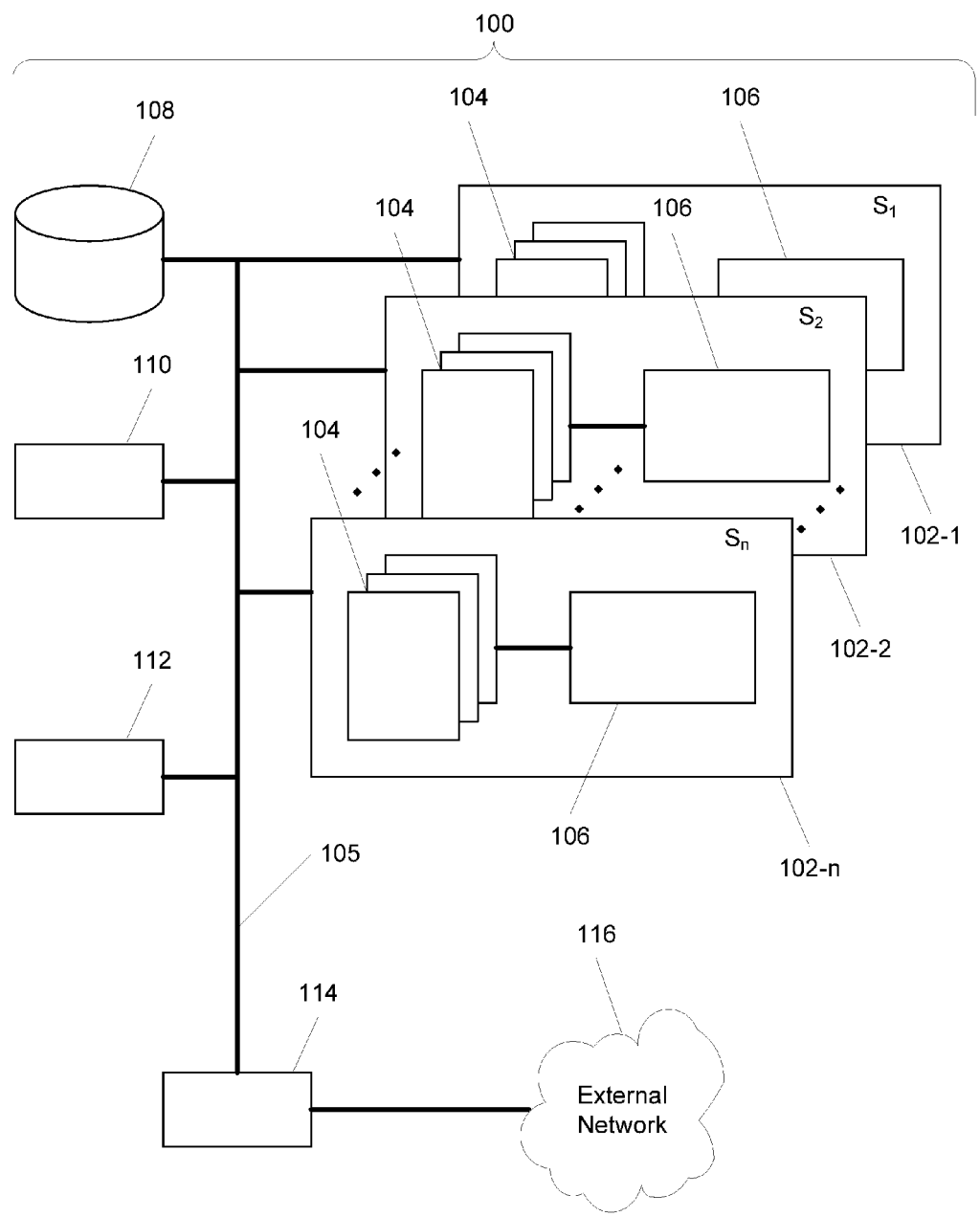
FIG. 1 illustrates, in simplified form, an example hardware environment suitable for implementation of, and implementing, the approach described herein.

FIG. 1 illustrates, in simplified form, an example hardware environment 100 suitable for implementation of, and implementing, the approach described herein. As shown in FIG. 1, the system is made up of multiple servers $S_1$ through $S_n$ 102-1, 102-2, . . . , 102-n each containing at least one, and potentially more (such as shown), processor(s) 104 coupled to memory 106, in the form of, for example, RAM, ROM, program storage, cache, buffers, etc. so that the processor(s) 104 can execute programs and access data. The servers 102-1, 102-2, . . . , 102-n are networked, over a system bus 105, to each other and, for example, non-volatile mass storage 108, I/O 110, other internal devices 112 on the network, for example, one or more of printers, displays, routers, scanners, etc., and an appropriate external network gateway 114, through which they may be coupled, in a conventional manner, to an external network 116, for example, the internet or a telecommunications network. The physical items that can constitute the components 102-1, 102-2, . . . , 102-n, 104, 106, 108, 110, 112 and 114 are all well known and thus will not be described in any further detail.

Figure 2:
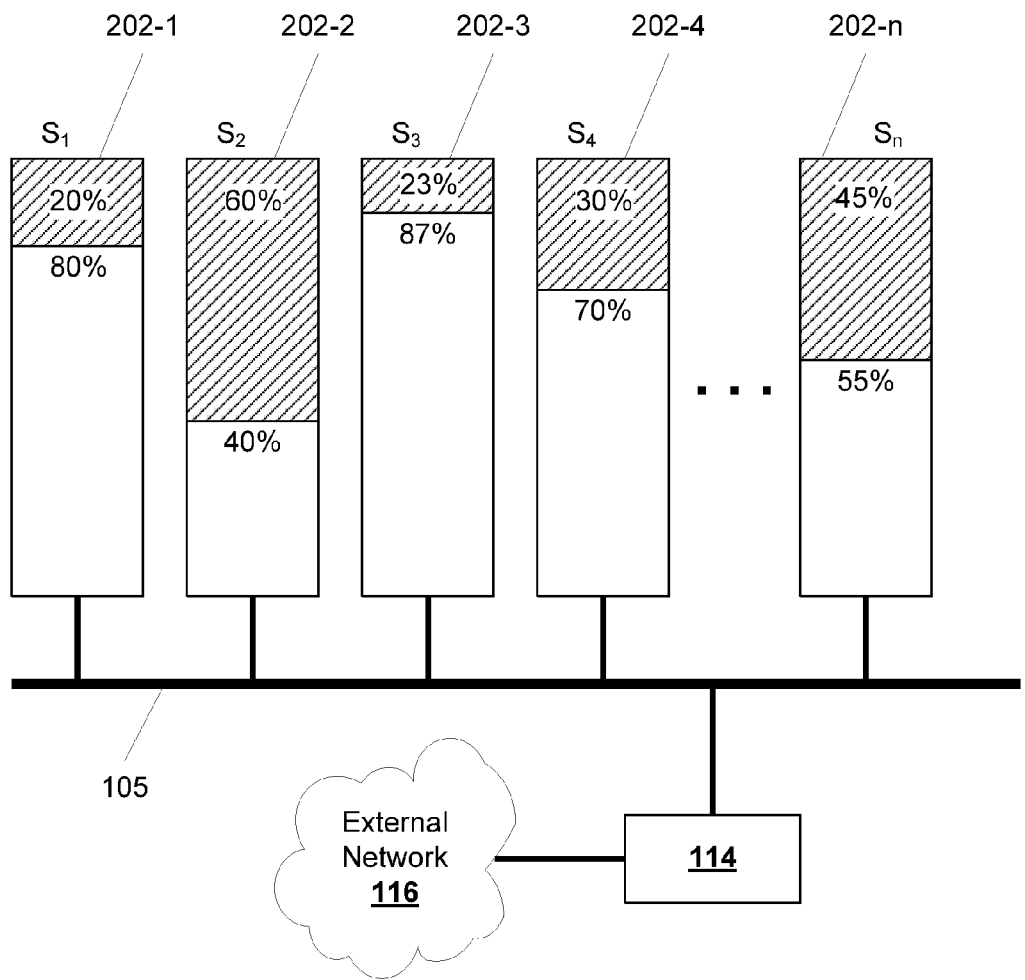
FIG. 2 illustrates, in simplified form, a set of servers that are the same as, or analogous to, the servers of FIG. 1 but showing server utilization immediately before implementation of our solution.

FIG. 2 illustrates, in simplified form, a set of servers $S_1$, $S_2$, $S_3$, $S_4$, . . . , $S_n$, (202-1, 202-2, 202-3, 202-4, . . . , 202-n) that are the same as, or analogous to, the servers 102-1, 102-2, . . . , 102-n of FIG. 1, but representing for each, server utilization immediately before implementation of our solution. As shown in FIG. 2, each of the servers 202-1, 202-2, 202-3, 202-4, . . . , 202-n has certain amount of maximum utilization of the overall capacity and, consequently, a some amount of unused capacity. For example, Server $S_1$ has 80% of its overall capacity being used by legacy programs, leaving 20% unused capacity, Server $S_n$ has only 55% of its overall capacity being used by legacy programs, leaving 45% unused capacity, and Server $S_2$ has only 40% of its overall capacity being used by legacy programs, leaving 60% unused capacity. As noted above, this means that, for just those three servers, there is 125% unused capacity, about 1.25 server's-worth of capacity is wasted from those three servers alone.

As also noted above, and as will now be described, we have devised a solution to the problem by deploying a framework on top of an existing server infrastructure that allows the unused capacity of one or more servers, for example, Server $S_2$ 202-2 and Server $S_n$ 202-n of FIG. 2, to be used by instances of an ensemble application running in lightweight containers without needing a new Host Name or incurring the problems associated with dynamic discovery noted above.

As a backdrop to the solution, it is worth again noting the operational constraints for our solution. First, the new ensemble application instances will run inside containers that each have a separate namespace. Second, the containers share a Host Name with the Host. Third, the ensemble application instances will be added alongside legacy application(s) inside containers without requiring any changes be made to the ensemble application or the already-present legacy application(s). In other words, there is no need to do anything to the legacy application and it will be unaffected by an ensemble application instance once installed and there is no need to do anything to the ensemble application either. Fourth, the ensemble application instances will be unaware that they are being run in containers. Fifth, from the client-side and operating system perspective, there is a still a dynamic discovery process that results in the actual pairing of the IP address of a Host and a port. Sixth, the installation of an ensemble application instance inside a container is dynamic and non-deterministic.

Our solution employs a two-part framework, one part that runs on top of the operating system on its own server and another part, installed on the existing server(s), to collectively coordinate container creation, management and cleanup using IP Tables within shared custom libraries to thereby implement a novel approach to port forwarding which will now be discussed with reference to FIG. 3.

Figure 3:
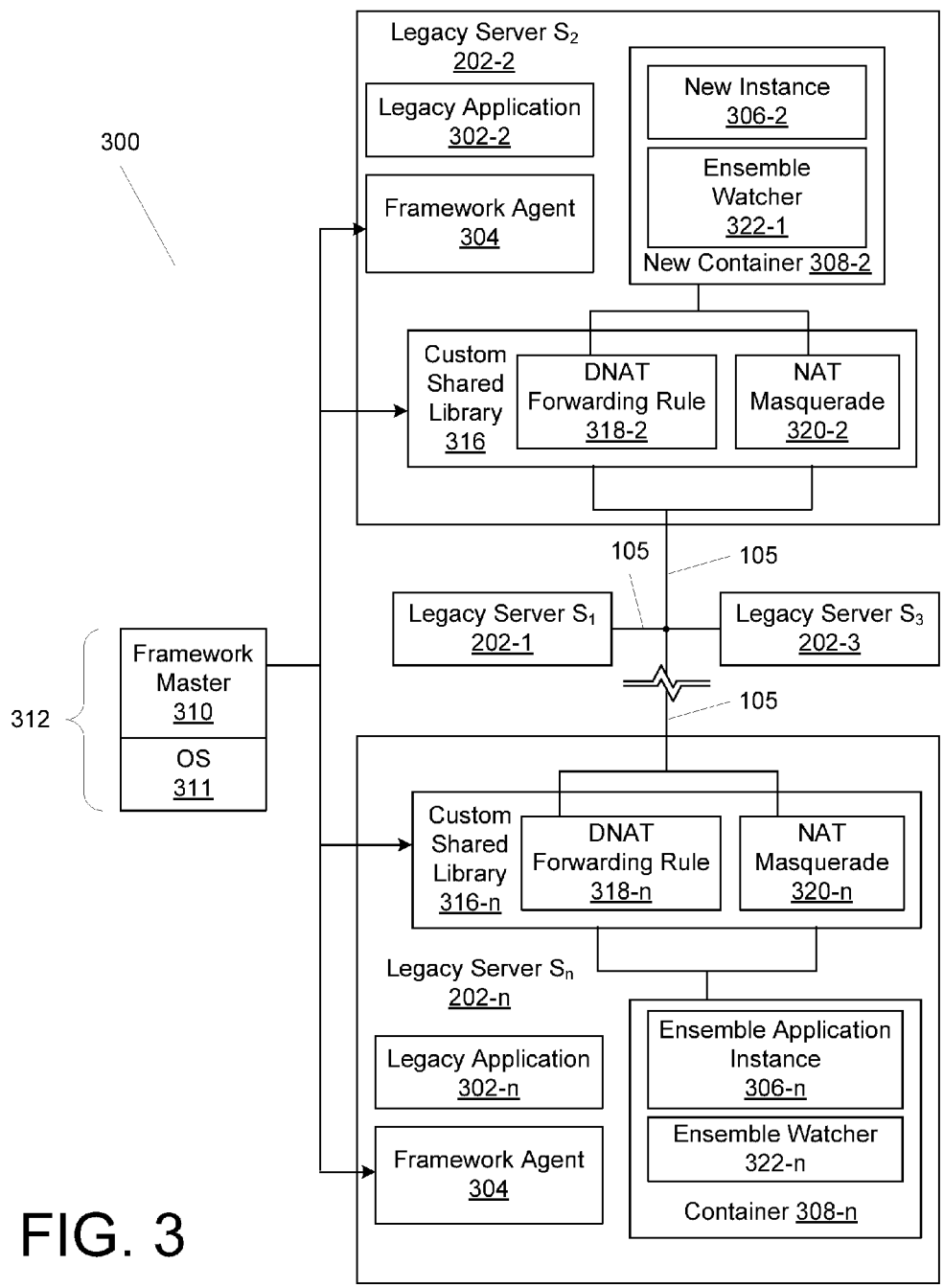
FIG. 3 illustrates, in simplified form, a functional representation of the functional components involved in implementing our approach on, for example, the Server $S_2$ of FIG. 2.

In this regard, FIG. 3 illustrates, in simplified form, a functional representation 300 of the functional components involved in one example implementation of our approach (in a Linux environment) to install a new instance of an ensemble application inside a container alongside a legacy application on a legacy server, for example, Server $S_2$ 202-2 of FIG. 2, that will allow it to communicate with another instance of that ensemble application installed in a container on a different legacy server, for example, Server $S_n$ 202-n of FIG. 2.

As shown in FIG. 3, a legacy application 302-2 is already installed and running on the Server $S_2$ 202-2. According to our approach, a new ensemble application instance 306-2 will be installed in a new container 308-2 on that same Server $S_2$ 202-2.

Likewise, another Server $S_n$ 202-n already includes an instance 306-n of the ensemble application running in its container 308-n alongside another legacy application 302-n and previously installed according to the teachings herein.

As noted above, the new ensemble application instance 306-2 needs to be installed such that from its perspective, the ensemble instance 306-n operates via the same ports as it expects and, likewise, the new ensemble application instance 306-2 will appear to the ensemble instance 306-n as operating via those same ports as well. As noted above, the installation and management process to achieve this is handled by our framework.

The framework is made up of two parts, a framework agent 304, which is installed on each legacy server 202 where a new application could be installed, and a framework master 310 which runs on top of the operating system 312 of its own server 314. The framework handles creation of the new container 308-2 on the specified server, in this case, Server $S_2$ 202-2 and manages the new application instance's interaction with other instances of that application, applications in other containers [QUESTION FOR THE INVENTORS: Must all instances of the ensemble application be run in containers if any one instance will, or could some instance(s) be running outside of containers on their own server(s)??], and the "outside world" (e.g., the network/other servers & devices 114 (FIG. 1)).

The framework 304, 310 makes use of the custom shared library 316 feature of Linux (or its analogs/counterparts in the UNIX, Apple OSX and/or Windows environments as applicable) to implement IP Tables that contains destination network address translation ("DNAT") 318 and NAT Masquerade 320 rules to implement port forwarding and port translation such that, as noted above, all instances of the ensemble application appear to be operating via the same ports. The DNAT forwarding rules handle incoming network traffic translation by routing packets directed to application instances via dynamically assigned ports to the port the application instance expects to listen on. The NAT masquerade rule modifies packets sent by the application instance to the expected port for another instance on another server, to reflect the dynamically assigned port assigned to the sending application instance so that it will appear to the host for the destination application instance as if it is coming from the Host IP address for the sending application instance.

Finally, an "ensemble watcher" 322-1, 322-n is installed in each container 308-2, 308-n holding an instance 306-2, 306-n of the ensemble application.

As noted above, as a class, ensemble applications typically expect that the port numbers for all instances within the ensemble will be the same for all running instances, irrespective of serve Host Name. For example, three individual running instances of the same ensemble application might all use port 10,000 and expect to make connections with the other instances via that same port (e.g., Instance A on Server A connects to Instance B on Server B on port 10,000, Instance B on Server B would connect to Instance X on Server X on port 10,000, and so on for all instances). If that does not happen for all instances, which would conventionally be the case with dynamic discovery, the ensemble application will not work properly, if at all.

Thus, having described the various functional components involved in our process, the process will now be described in connection with FIG. 4.

Figure 4:
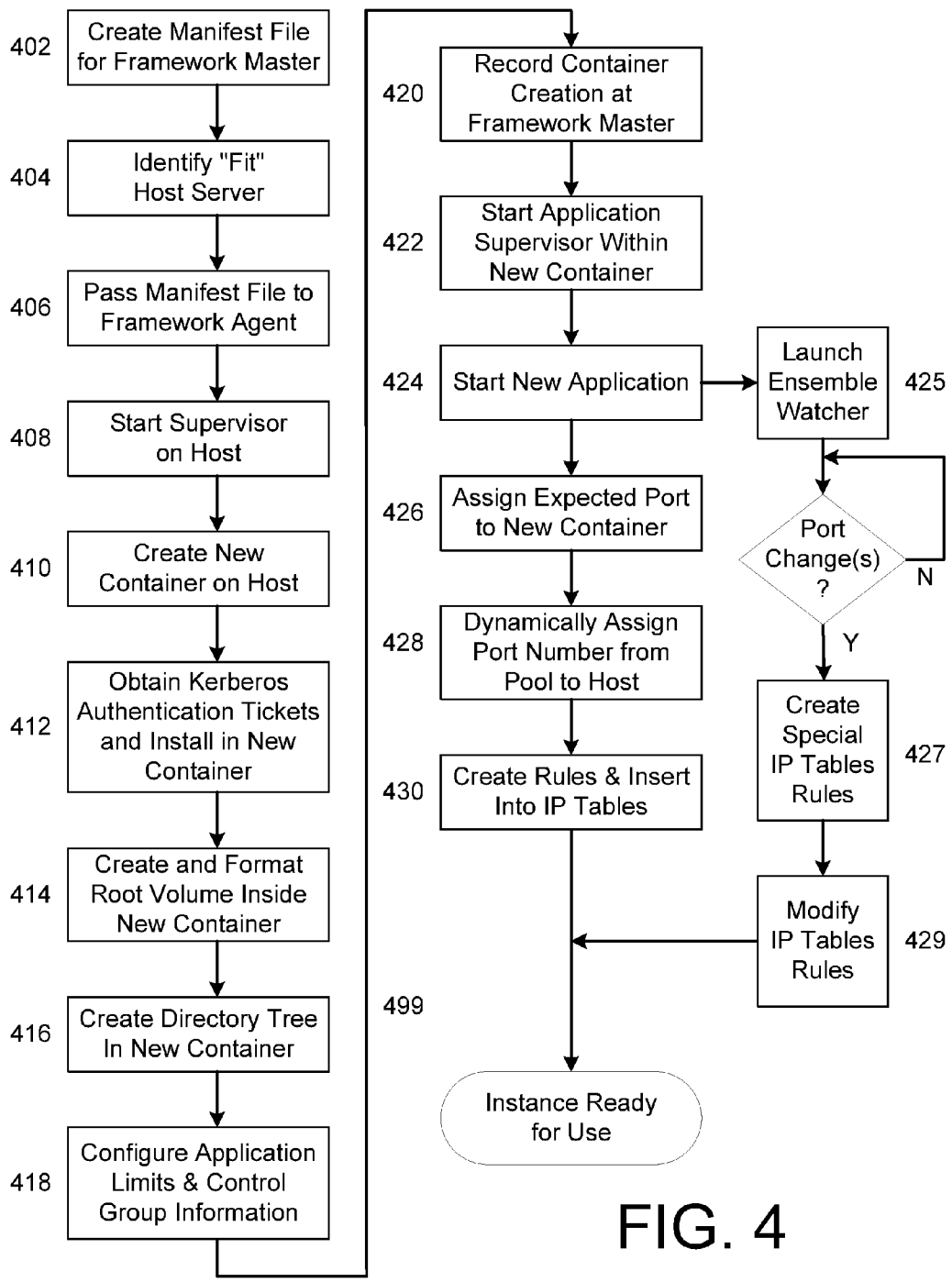
FIG. 4 illustrates, in simplified form, a flowchart of the overall process from the perspective of our framework.

FIG. 4 illustrates, in simplified form, a flowchart of the overall process from the perspective of our framework.

The process begins with the creation of a manifest file on the framework master 310 for the new application to be installed within the excess capacity of a legacy server (Step 402). The manifest file for this approach includes a specific feature that enables this functionality across a group of applications that require this type of handling (as opposed to, for example, other types of actions that may be specified in the manifest file for this or other types of applications). In particular, the manifest file indicates the port number(s) that are expected to be used across all application instances within the ensemble. In other words, the port number(s) that the ensemble application requires for all of its instances.

Next, the framework master 310 selects a host server, for example, server $S_2$ 202-2, from among the existing servers $S_1$ through $S_n$, whose excess capacity is a good fit or the best fit for hosting the new container 308-2 for the new instance 306-2 (Step 404).

The framework master 310 then passes the manifest file for the new instance 306-2 to the framework agent 304-2 on the host server 202-2 on which the new instance will be installed (Step 406).

The framework agent 304-2 that receives the manifest file then starts a supervisor on its host server 202-2 (Step 408) which is used to create and manage the new container 308-2 and the log files that will be associated with it (Step 410).

The framework then obtains Kerberos authentication tickets and installs them in the new container 308-2 (Step 412).

Next, a root volume is created and formatted in the new container 308-2 (Step 414) and a directory tree for the new application instance 306-2 is created in the new container 308-2 (Step 416).

Then, application limits and control group ("cgroup") information is configured to account for and isolate the resource usage (e.g. CPU, memory, I/O, etc.) of the new application instance 306-2 (Step 418).

Once the preceding steps are complete, the framework agent 304-2 notifies the framework master 310 that the new container 308-2 has been created (Step 420) and the framework agent 304-2 starts an application supervisor within the new container 308-2 for the new application instance 306-2 (Step 422) which, in turn, starts the new application instance 306-2 (Step 424).

The framework agent 304-2 then assigns the port(s) specified in the manifest file to the new application instance 306-2 in the new container 308-2 (Step 426) and a port selected from a pool of available ports is dynamically assigned to the host name for the container (Step 428).

The framework agent 304-2 then creates IP Tables rules (the DNAT 318-2 rules and NAT Masquerade 320-2 rules) that indicate that when any network connections arrive inbound to this host name on the port assigned from the pool to the host name for the container 308-2, it will actually be routed into the container 308-2 on the port expected by the application instance 306-2 (Step 430).

At this point, the application instance is ready for use (Step 499).

Concurrent with, or immediately after, the new application instance 306-2 is started, the framework agent 304-2 launches an "Ensemble Watcher" 322-2 inside the container 308-2 (Step 425). The ensemble watcher continually watches all ensemble application instances to see if any change, for example, due to a stop and re-start, or movement of the instance. When any port changes for any ensemble instance(s) are identified, the ensemble watcher creates a list of special IP Tables rules (firewall NATing rules) that will modify the IP Tables rules then in effect to ensure, whenever this instance 306-2 tries to make a TCP connection to any other instance 306-n in the ensemble, that network connections leaving this container 308-2 and trying to connect to another ensemble application instance 306-n on another server $S_n$ 202-n via the expected port, the port to be connected to will be changed to reflect the dynamically assigned port of the remote container 308-n containing the other instance 306-n (Step 427). The ensemble watcher then inserts the special IP Tables rules into the currently running IP Tables rules 318-2, 320-2 to update the rules to coincide with the port change(s) for such other instance(s) (Step 429).

As a result of the above, the new application instance 306-2 will now be running on the legacy server 202-2 without needing a new hostname, its own IP address or separate security set up, thereby taking advantage of the excess capacity of the legacy server 202-2 that would otherwise go unused.

Finally, for purposes of completeness, a simplified example of the port forwarding aspect will be presented to illustrate the effect of implementing our process. For purposes of example, presume that the ensemble application involves two currently running instances (Instance "X" and Instance "Y") that were previously installed in their own containers on two different servers using the process described herein and have random external ports assigned as described above. In addition, presume that these instances all expect network connections to be made on port 10,000.

Now, an additional instance of the ensemble application, Instance "Z" is to be started on a third server. During the installation process, the manifest file will have identified the expected port as port 10,000. Thus, that port number will be assigned to the ensemble application Instance "Z" when it is installed into its new container. Through the dynamic discovery process however, the framework agent will assign an available port from a pool, for example, TCP port 21,212 to the host name for the container where ensemble application Instance "Z" is located. Thus, the framework agent for the server hosting ensemble application Instance "Z" will create IP Tables rules to indicate that when network traffic arrives at this host name on port 21,212, it will be routed to the container for ensemble application Instance "Z" on port 10,000. By extension, the same approach applies and is performed for all instances of the ensemble application.

Now, assume that at some point, Instance "X" and Instance "Y" halt and restart such that their actual assigned ports are now respectively 31,313 and 51,515. As a result, the ensemble master will detect the changes and modify the IP Tables rules for ensemble application Instance "Z" so that, if ensemble application Instance "Z" tries to connect to Instance "X" on port 10,000, the IP Tables values will have been changed to reflect that the connection should be directed at that point to port 31,313 (the actual port), irrespective of whatever port it may have been assigned (and may have previously been in effect for that instance in the IP Tables for the container of Instance "Z" in the past). For example, if shortly thereafter, the server containing Instance "X" crashes, the connection from Instance "Z" can be rescheduled to Instance "Y" on port 51,515 and the connection will succeed even though, for example, when Instance "Z" was originally started. the IP Tables rules for Instance "Y" reflected a port of 41,414.

Thus, as should now be appreciated, our approach ensures that, from the perspective of all instances of the ensemble application running in their containers, they are all listening on the same expected port, whereas, in reality, they al have different ports and dynamic port assignment and dynamic port forwarding is in effect.

Having described and illustrated the principles of this application by reference to one or more embodiments, it should be apparent that the embodiment(s) may be modified in arrangement and detail without departing from the principles disclosed herein and that it is intended that the application be construed as including all such modifications and variations insofar as they come within the spirit and scope of the subject matter disclosed.

What is claimed is:

1. A method for installing an instance of an ensemble application in excess capacity of a legacy server in a cluster that allows for inter-instance communication, the method comprising:

identifying a server having excess capacity suitable for installation of an instance of the ensemble application;

receiving a manifest file at the server, the manifest file including at least an expected communication port for the instance of the ensemble application;

creating a container for the instance of the ensemble application on the identified server;

installing the instance of the ensemble application within the container;

assigning the expected communication port to the instance of the ensemble application;

dynamically assigning an available actual port to the container containing the instance of the ensemble application;

creating IP Tables rules applicable to the instance of the ensemble application that will:
  i) modify network connections, received from an other instance of the ensemble application on another server that are directed to the assigned actual port of the container containing the instance of the ensemble application, from the assigned actual port to the expected port within the container for the instance of the ensemble application; and
  ii) modify network connections, sent by the instance of the ensemble application via the expected port and directed to the expected port of a separate instance of the ensemble application on a different server, to a specific actual port indicative of where the separate instance of the ensemble application is running.

2. The method of claim 1 further comprising:
launching an ensemble watcher within the container for the instance of the ensemble application on the identified server.

3. The method of claim 2 further comprising:
monitoring for port changes applicable to other instances of the ensemble application running on other servers; and
when the monitoring identifies a specific port change for a particular instance, updating the IP Tables rules to reflect the specific port change for the particular instance.

4. The method of claim 1 further comprising:
creating the manifest file at a framework master running on a framework server coupled to the legacy server.

5. The method of claim 1 further comprising:
starting an application supervisor within the container for the instance of the ensemble application on the identified server.

6. A server environment system comprising multiple servers interconnected to each other in a cluster on a network, the system comprising:
  a first server having a first instance of an ensemble application installed in a first container thereon alongside a first legacy application that was installed on the first sever prior to creation of the first container, the first container having a first dynamically assigned port, and a second server having a second instance of the ensemble application installed in a second container thereon, the second container having a second dynamically assigned port, the first and second instances each having an identical expected port via which they are to receive inter-application communications;
  a first framework agent, running on the first server, the first framework agent having caused installation of the first instance within the first container;
  a second framework agent running on the second server, the second framework agent having caused installation of the second instance within the second container;
  a custom shared library on the first server including IP Tables rules, the custom shared library being interposed between the first container and the network and configured to (i) trap communications, sent by the first instance and intended for the expected port of the second instance, and redirect it to the dynamically assigned port of the second container, and (ii) trap communications sent to the first instance, via the dynamically assigned port of the first container, and redirect them to the expected port of the first instance.

7. The server environment system of claim 6, wherein the first container shares a hostname with the first server.

8. The server environment system of claim 6, further comprising:
  a framework master running on top of an operating system, on a server different from the first server and the second server, and communicatively coupled to the first framework agent and the second framework agent.

9. The server environment system of claim 8, wherein the operating system is a Linux operating system.

10. The server environment system of claim 6, further comprising:
  a custom shared library on the second server including IP Tables rules, the custom shared library being interposed between the second container and the network and configured to (i) trap communications, sent by the second instance and intended for the expected port of an other instance, and redirect it to the dynamically assigned port of a container for the other instance, and (ii) trap communications sent to the second instance, via the dynamically assigned port of the second container, and redirect them to the expected port of the second instance.

11. The server environment system of claim 6, further comprising:
  an ensemble watcher, running on in at least one of the first container or the second container, and configured to monitor for changes to dynamically assigned ports for instance containers and, when a port change for any instance is detected as a result of the monitoring, and update the IP Tables rules to reflect the port change for the instance.

12. The server environment system of claim 6, further comprising:
  a second legacy application on the second server, the second legacy application having been installed on the second server prior to installation of the second container on the second server.

* * * * *